(12) United States Patent
Russell

(10) Patent No.: US 6,340,333 B1
(45) Date of Patent: Jan. 22, 2002

(54) FLEXIBLE MOLDED CORE SHAFT

(75) Inventor: Robert D. Russell, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/427,011

(22) Filed: Oct. 25, 1999

(51) Int. Cl.$^7$ ................................................. F16D 3/52
(52) U.S. Cl. ........................ 464/87; 264/279.1; 464/903; 464/182; 464/181
(58) Field of Search ........................... 464/87, 88, 92, 464/181, 182, 183, 903; 384/26; 264/273, 274, 279.1, 278.1

(56) References Cited

U.S. PATENT DOCUMENTS

| | | | |
|---|---|---|---|
| 2,869,339 A | * 1/1959 | Drake | 464/85 |
| 4,280,339 A | * 7/1981 | Stuemky | 464/88 |
| 4,917,653 A | * 4/1990 | Collucci | 464/85 |
| 5,439,416 A | 8/1995 | Jaskowiak | |
| 5,683,641 A | 11/1997 | Jaskowiak | |
| 5,744,238 A | * 4/1998 | Limperis et al. | 464/181 |
| 5,876,288 A | 3/1999 | Jaskowiak | |
| 5,893,210 A | * 4/1999 | Takei et al. | 29/895.32 |
| 5,989,473 A | * 11/1999 | Haverty | 264/279.1 |
| 6,117,018 A | * 9/2000 | Tanada | 464/183 |

OTHER PUBLICATIONS

U.S. Pat. application Ser. No. 09/293,346, filed on Apr. 16, 1999, entitled "Hollow Shafts with Gas Assist Molding".
U.S. Pat. application Ser. No. 09/293,098, filed on Apr. 16, 1999, entitled "Plastic Shafts with Molded Core and External Feature".

* cited by examiner

Primary Examiner—Lynne H. Browne
Assistant Examiner—Aaron M Dunwoody
(74) Attorney, Agent, or Firm—John M. Kelly; David E. Henn

(57) ABSTRACT

Torque transmitting, molded flexible shaft assemblies having two rigid, tubular, shell-like sections that are filled and linked together by a flexible material. The two sections are placed in a mold such that they are separated by an elongated cavity. A flexible-when-hardened moldable material such as polyurethane then fills the mold such that the two sections and the elongated cavity are filled by the moldable material.

18 Claims, 3 Drawing Sheets

FLEXIBLE MOLDED CORE SHAFT

FIELD OF THE INVENTION

The present invention relates to shaft for use in machines. In particular, the present invention relates to flexible shafts comprised of at least two rigid, tubular, shell-like portions containing, and linked together by a flexible, moldable material.

BACKGROUND OF THE INVENTION

While the present invention has utility in apparatus comprising various mechanical components, it has particular application, and will therefore be described with reference to, electrostatographic printers. FIG. 1 illustrates an exemplary electrostatographic printer 8. That printer includes a photoconductive drum 10 that rotates in the direction 11. The surface of the drum 10 is charged to a substantially uniform potential by a corotron 12. The charged drum is then exposed to a light image of an original document 15 on an exposure platen 16 by means of an exposure lamp 17. The original document is moved over the exposure platen such that the full document is exposed to light from the exposure lamp. The light image of the original document discharges the charged surface of the drum so as to create an electrostatic latent image of the original document. A developer 20 then deposits toner on the electrostatic latent image so as to produce a toner image of the images on the original document 15. The toner image is comprised of charged toner particles that triboelectrically adhere to the electrostatic latent image. The toner image is subsequently transferred at a transfer station 24 onto a substrate 21, which is fed by a paper tray feeder 22 into intimate transfer contact with the toner image. The transferred toner image is then permanently affixed to the substrate by heat and/or pressure in a fuser 23. After transfer, residual toner, paper particles, dust, or other debris on the drum 10 is removed by a cleaner 26 in preparation for the next imaging cycle.

While FIG. 1 provides a simplified description of an exemplary electrostatographic printer, in practice such printers are far more complex. For example, such printers include numerous electrical subsystems, such as digital controllers and power supplies, and mechanical subsystems that rotate the drum, move substrates through the machine, and sort and staple image-bearing substrates together. For example, FIG. 2 illustrates a simplified view of the paper tray feeder 22. That feeder includes a tray for holding substrates 30 and an upper frame member 26 that closes over the tray. The upper frame member selectively removes the top substrate from the paper tray and feeds it as described above. To assist removal and feeding, the upper frame member includes two shafts, the shafts 32 and 34. Those shafts retain gears, rolls, pulleys, and friction surfaces, may include retention or location features such as, snaps, fitting elements or stops, and may contain other features such as bearings, bushings, rollers, journals and 0-rings. When a gear 36 on the shaft 32 is rotated by an external drive, a friction surface 38 contacts the topmost substrate and advances it toward the shaft 34. The shaft 34 is rotated by a drive belt 35 connected on a pulley 37 and a pulley 39. The shaft 34 includes rollers that further advance the substrate into the remainder of the printer.

In the prior art most electrostatographic printing machines used shafts made from solid materials such as steel and aluminum. Functional features or elements, such as rollers or gears, were then individually mounted on the shaft or were formed in place using metal working techniques such as turning, milling and grinding. Therefore, the completed shaft required significant manual labor. While satisfactory in many respects, the resulting shaft assemblies were rigid, heavy, and costly.

While rigid shafts are beneficial in many applications, in other applications some flexibility is beneficial. For example, when a rigid shaft is used to couple a driven element to a drive element careful alignment is required. Even a relatively minor misalignment can introduce destructive bending, vibration, and torque. However, flexible shafts can reduce alignment problems. In addition to reducing alignment problems highly flexible shafts can transmit forces around bends and corners.

Attempts have been made to provide shaft assemblies with reduced weight and cost. One approach is to use a composite shaft process. The composite shaft process may be more fully understood with reference to U.S. Pat. No. 5,439,916; U.S. Pat. No. 5,876,288; and U.S. Pat. 5,683,641. The composite shaft process utilizes a hollow metal tube into which slits or holes are machined through the wall of the tube. The tube is then placed in a molding machine and a moldable material is injected into the opening on the end of the tube and passed through the slits or holes to fill functional features formed in a mold cavity. While the composite shaft process provides for improved performance and reduce costs, the use of a cylindrical metal tube adds costs to the shaft assembly.

U.S. patent application Ser. No. 09/293,346, entitled "Hollow Shafts with Gas Assist Molding," filed on Apr. 16, 1999 and U.S. patent application Ser. No. 09/293,098, entitled "Plastic Shafts with Molded Core and External Feature," filed on Apr. 16, 1999 teach a molding process for plastic tubes. According to those patents a hollow plastic tube having slits or holes is placed in a molding machine. A moldable material is injected into the slits or holes via the end of the tube. The moldable material passes through the slits or holes to fill functional features in a mold cavity.

While the teachings of U.S. patent application Ser. No. 09/293,346 and U.S. patent application Ser. No. 09/293,098 are beneficial, they produce rigid shafts. Therefore, it would be even more beneficial to extend those teachings to enable production of flexible shaft assemblies.

SUMMARY OF THE INVENTION

The principles of the present invention provide for molded, flexible shaft assemblies. A molded, flexible shaft assembly according to the principles of the present invention is comprised of at least two rigid, tubular, shell-like portions containing, and linked together by, a flexible, moldable material. Beneficially the moldable material is polyurethane.

BRIEF DESCRIPTION OF THE DRAWINGS

For a better understanding of the present invention reference should be made to the following drawings and descriptions.

DESCRIPTION OF PREFERRED EMBODIMENT

Figure 1:
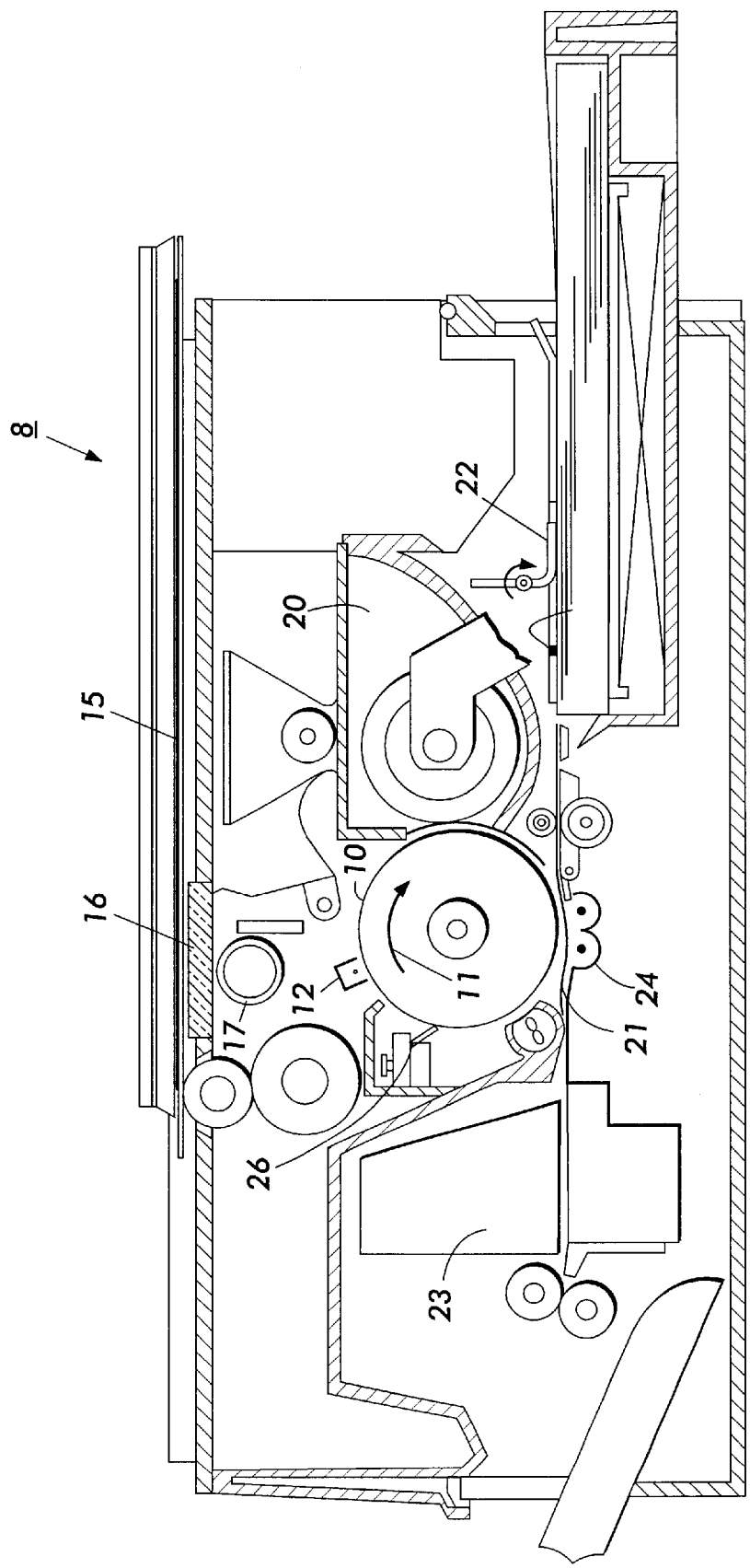
FIG. 1, which provides a schematic representation of an exemplary electrostatographic printing machine.
Figure 2:
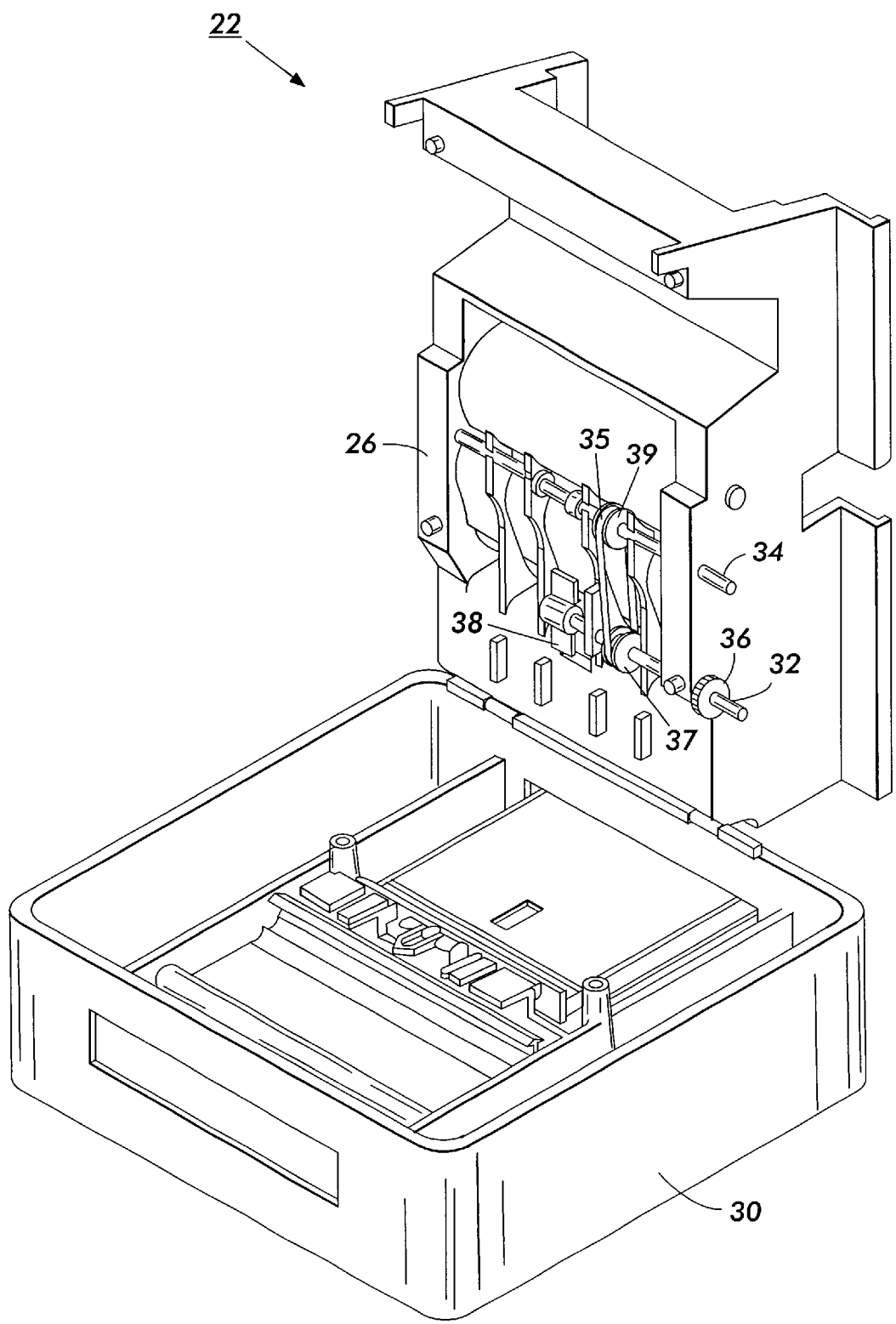
FIG. 2, which provides an isometric view of a paper tray feeder assembly.
Figure 3:
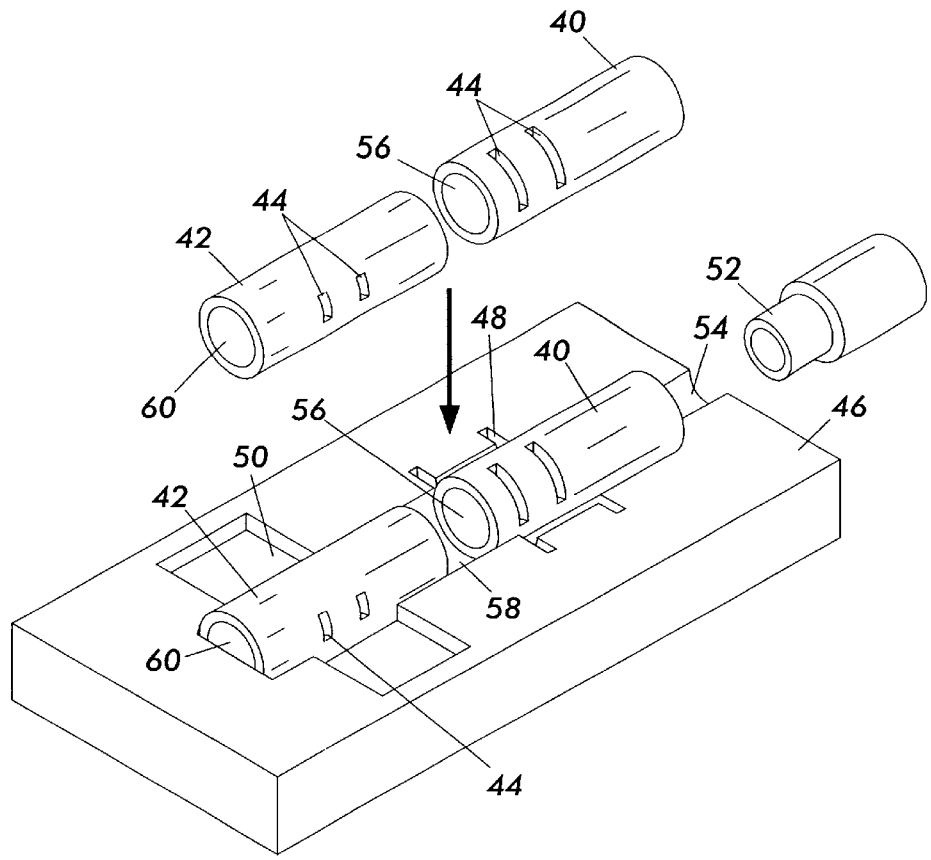
FIG. 3, which provides a perspective view illustrating a composite molding shaft process according to the principles of the present invention.
Figure 4:
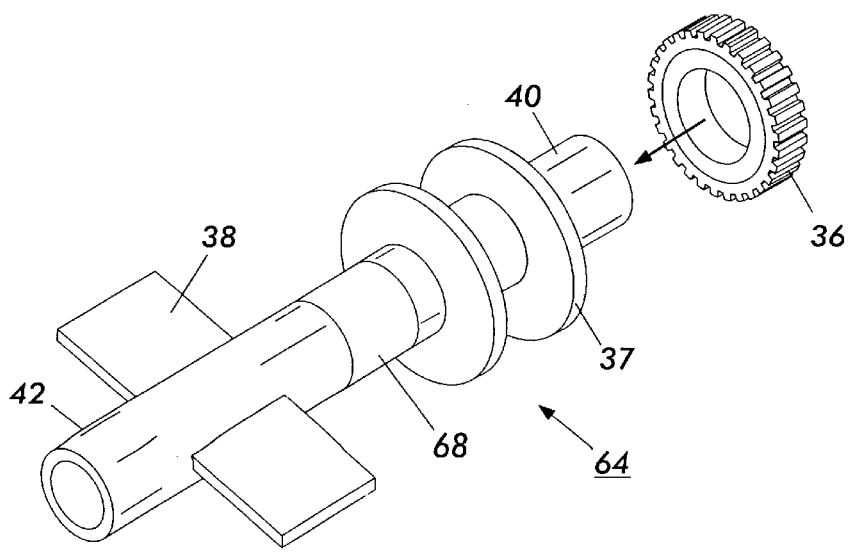
FIG. 4, which provides a perspective view of a molded, flexible shaft assembly according to the principles of the present invention.

Attention is now directed to FIG. 3 for a general overview of a process that produces a flexible shaft assembly according to the principles of the present invention. Reference also can be made to U.S. Pat. Nos. 5,439,416; 5,876,288; and 5,683,641 for descriptions of a similar process. As shown in FIG. 3, a plastic, tubular member is cut into two shell-like sections, the sections 40 and 42. Each section can include one or more molding aperture gates 44 through their wall. The sections 40 and 42 are then placed in a lower mold 46 having cavities 48 and 50. The cavities are used to form functional features, such as a pulley and a flapper. The lower mold 46 is closed by an upper mold (not shown for clarity) that is the mirror image of the lower mold 46. A moldable material that cools into a flexible material is pressure injected from a nozzle 52 into the closed mold through an input opening 54 into the hollow volume 56 of the section 40. The lower mold 46 also includes a cylindrical cavity 58 that connects the section 40 to the section 42. The moldable material flows through the aperture gates 44 of section 40 to fill the mold cavity 48. Additional moldable material flows through and fills the cylindrical cavity 58 and a hollow volume 60 of the section 42. The moldable material also passes through the aperture gates 44 of the section 42 and into the cavity 50. During this process it is important that the moldable material is sufficiently fluid to flow through the aperture gates 44, the hollow volumes 56 and 60, and the cylindrical cavity 58.

When the moldable material hardens the mold is opened and a shaft 64 is removed. The moldable material that passed through the aperture gates 44 of the section 42 forms a high friction, flexible flapper 38 and the moldable material that passes through the aperture gates 44 of the section 40 forms the pulley 37. Additionally, the moldable material that fills the cylindrical cavity 58 forms a flexible coupling 68 between the section 40 and the section 42. As illustrated, additional items as desired may be added to the shaft 64, such as the gear 36, to form the shaft assembly 32.

While the sections 40 and 42, as well as the cylindrical cavity 58 are shown as being tubular, shafts having other cross-sections can be formed similarly. Additionally, there are few dimensional limits on the size of the shaft that can be formed. However, as a practical matter the smaller the internal diameter and the longer the shaft assembly the more difficult it is to insure that the moldable material will fill the entire mold cavities. The plastic, tubular, and elongated member that is cut to form the sections 40 and 42 is beneficially formed by gas assist injection molding. This process enables elongated, plastic members having thin walls. The moldable material may be selected from a variety of materials which can be handled in a molding process and that provides the flexibility desired in the flexible coupling. A beneficial moldable material is polyurethane or a thermoplastic elastomer. The moldable material may be unfilled and filled with materials to impart selected properties such as fire retardancy or color. Depending on the particular application of the shaft assembly it may be desirable to select materials having similar coefficients of thermal expansion.

It is important that the aperture gates are sufficiently large and present in sufficient number to enable the moldable material to flow through them into the cavity. If the holes, gates, or ports are integrally molded with the tube, a simple circular hole may be most easily implemented. In this regard it should be noted that a mold cavity may form a functional feature on an end of the tubular shell.

While the invention has been described with reference to a flexible shaft assembly useful in electrostatographic printing machine, it will be understood to those skilled in the art that it may be used in virtually any machine performing a function which requires the use of a rotatable shaft member. Accordingly, it is intended to embrace all such alternatives and modifications as may fall within the spirit and scope of the appended of claims.

I claim:

1. A flexible shaft assembly, comprising:
    an elongated first tubular member;
    an elongated second tubular member;
    an elastic member connecting said first tubular member to said second tubular member, said elastic member further filling at least part of said first tubular member and said second tubular member; and
    wherein said first tubular member has an aperture through a wall, and wherein said elastic member fills said aperture.

2. A flexible shaft assembly according to claim 1, wherein said elastic member extends from said aperture to define a feature on the outer periphery of said first tubular member.

3. A flexible shaft assembly according to claim 1, wherein said elastic member is a thermoplastic elastomer.

4. A flexible shaft assembly according to claim 1, wherein said elastic member is polyurethane.

5. A flexible shaft assembly according to claim 1, wherein said first tubular member is plastic.

6. A flexible shaft assembly according to claim 5, wherein said first tubular member is made by a gas assist injection molding process.

7. A flexible shaft assembly according to claim 1, wherein said shaft assembly is made by a molding process in which said first tubular member and said second tubular member are placed in a mold such that a cavity is between said first tubular member and said second tubular member, and wherein a moldable plastic material is injected into the mold such that the moldable plastic material fills said first tubular member, said second tubular member, and said cavity.

8. A flexible shaft assembly according to claim 1, wherein said first tubular member has a circular cross section.

9. A printing machine having a flexible shaft assembly comprising:
    an elongated first tubular member;
    an elongated second tubular member;
    an elastic member connecting said first tubular member to said second tubular member, said elastic member further filling at least part of said first tubular member and said second tubular member; and
    wherein said first tubular member has an aperture through a wall, and wherein said elastic member fills said aperture.

10. A printing machine according to claim 9, wherein said elastic member extends from said aperture to define a feature on the outer periphery of said first tubular member.

11. A printing machine according to claim 9, wherein said elastic member is polyurethane.

12. A printing machine according to claim 9, wherein said first tubular member is a plastic.

13. A printing machine according to claim 12, wherein said first tubular member is made by a gas assist injection molding process.

14. A printing machine according to claim 9, wherein said shaft assembly is made by a molding process in which said first tubular member and said second tubular member are placed in a mold such that a cavity is between said first tubular member and said second tubular member, and wherein a moldable plastic material is injected into the mold such that the moldable plastic material fills said first tubular member, said second tubular member, and said cavity.

15. A printing machine according to claim 9, wherein said first tubular member has a circular cross section.

16. A printing machine according to claim 9, wherein said elastic member is a thermoplastic elastomer.

17. A process for making a rotatable shaft assembly having an elastic member integrally molded therewith, the process comprising the steps of:

provinding a hollow elongated first tubular member having an aperture through a wall;

providing a hollow elongated second tubular member;

placing the first tubular member and the second tubular member in a mold such that an axial cavity exists between the first tubular member and the second tubular member and such that said aperture opens into a mold cavity;

filling the mold with a hardenable, moldable material, flowing the moldable material through said first tubular member, through said axial cavity, and through said aperture;

permitting the moldable material to harden to form the elastic member; and removing the shaft assembly from the mold.

18. The process as in claim 17, wherein the step of providing a first tubular member comprises providing a first tubular plastic member.

* * * * *